US007236838B2

(12) United States Patent
Katayama et al.

(10) Patent No.: US 7,236,838 B2
(45) Date of Patent: Jun. 26, 2007

(54) SIGNAL PROCESSING APPARATUS, SIGNAL PROCESSING METHOD, PROGRAM AND RECORDING MEDIUM

(75) Inventors: Takashi Katayama, Osaka (JP); Masaharu Matsumoto, Osaka (JP); Masahiro Sueyoshi, Osaka (JP); Kosuke Nishio, Osaka (JP); Takeshi Fujita, Osaka (JP); Akihisa Kawamura, Osaka (JP); Kazutaka Abe, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 1121 days.

(21) Appl. No.: 09/939,048

(22) Filed: Aug. 24, 2001

(65) Prior Publication Data

US 2002/0055796 A1 May 9, 2002

(30) Foreign Application Priority Data

Aug. 29, 2000 (JP) ............................ 2000-258533

(51) Int. Cl.
*G06F 17/00* (2006.01)
*H04B 1/00* (2006.01)

(52) U.S. Cl. ........................................ 700/94; 381/119

(58) Field of Classification Search ................ 381/307, 381/17–23, 27, 309, 310, 119; 700/94
See application file for complete search history.

(56) References Cited

U.S. PATENT DOCUMENTS 5,727,067 A * 3/1998 Iwamatsu .................... 381/18
6,052,470 A * 4/2000 Mouri .......................... 381/18
6,381,333 B1 * 4/2002 Suzuki ......................... 381/18
6,757,659 B1 * 6/2004 Tanaka et al. ............. 704/501

FOREIGN PATENT DOCUMENTS

JP 10-210600 * 7/1998

* cited by examiner

*Primary Examiner*—Sinh Tran
*Assistant Examiner*—Andrew C Flanders
(74) *Attorney, Agent, or Firm*—Renner, Otto, Boiselle & Sklar, LLP.

(57) ABSTRACT

A signal processing apparatus includes a decoder for decoding a stream signal so as to generate a digital audio signal of a low frequency effect channel and digital audio signals of first through n'th (n≧2) channels; an adder section for adding the digital audio signal of the low frequency effect channel and the digital audio signal of a specified channel among the first through n'th channels, so as to generate an addition signal; an n number of D/A conversion sections for converting the digital audio signals of the first through n'th channels, excluding the digital audio signal of the specified channel, and the addition signal into n types of analog audio signals; a first signal processing section for generating a digital audio signal of the low frequency effect channel; and a second signal processing section for generating an analog audio signal of the specified channel.

8 Claims, 10 Drawing Sheets

SIGNAL PROCESSING APPARATUS, SIGNAL PROCESSING METHOD, PROGRAM AND RECORDING MEDIUM

BACKGROUND OF THE INVENTION

1. Field of the Invention

The present invention relates to a signal processing apparatus and a signal processing method for converting multi-channel digital audio signals Into analog audio signals and outputting the analog audio signals; a program for executing signal processing; and a recording medium used for recording the program.

2. Description of the Related Art

A conventional signal processing apparatus 300 for converting multi-channel digital audio signals into analog signals and outputting the analog signals will be described with reference to FIGS. 9, 10 and 11. The signal processing apparatus 300 is incorporated in, for example, a DVD-Video player. The DVD-Video standards support reproduction of multi-channel audio signals up to 5.1 channels. FIG. 10 shows the arrangement of a 5.1 channel speaker unit. 5.1 channels means, as shown in FIG. 10, 5 channels including a left forward (L: left) center forward (C: center), right forward (R: right), left surround (LS), and right surround (RS) channel, and one channel of a low frequency effect channel (LFE).

FIG. 9 shows a structure of the signal processing apparatus 300. According to the DVD-Video standards, a 5.1 channel audio bit stream signal 40 is input to the signal processing apparatus 300. A decoder 6 receives the audio bit stream signal 40 and decodes the audio bit stream signal 40 into a digital audio signal (linear PCM). Then, the audio bit stream signal 40 separates the digital audio signal into a digital audio signal 31 of a first channel (a first channel digital audio signal 31), a digital audio signal 32 of a second channel (a second channel digital audio signal 32), . . . a digital audio signal 3*n* of an n'th (n≧2) channel (an n'th channel digital audio signal 3*n*), and a digital audio signal 30 of an LFE channel (an LFE channel digital audio signal 30). In the case of the 5.1 channel system, n=5. A down-mixing signal processing section 3 receives resultant digital audio signals 30, 31, . . . 3*n* and performs down-mixing signal processing.

Down-mixing signal processing can be performed in various manners. In the case of the 5.1 channel system, down-mixing signal processing can be performed, for example, as shown in FIG. 11. The down-mixing signal processing section 3 down-mixes the digital audio signals of 5.1 channels of L, R, C, SL, SR and LFE channels to 2.1 channels of L, R and LFE. In FIG. 11, digital audio signals of the SL, L, C, R, SR and LFE channels are indicated by reference numerals 51, 52, 53, 54, 55 and 50. The down-mixing signal processing section 3 includes multipliers 8*a*, 8*b*, 8*c*, 8*d*, 8*e* and 8*f* and adders 9*a* and 9*b*. Multiplication coefficients of the multipliers 8*a*, 8*b*, 8*c*, 8*d*, 8*e* and 8*f* are respectively m1, m2, m3, m4, m5 and m6. The multiplier 8*a* multiplies the SL channel digital audio signal 51 with the multiplication coefficient m1. The multiplier 8*b* multiplies the L channel digital audio signal 52 with the multiplication coefficient m2. The multiplier 8*c* multiplies the C channel digital audio signal 53 with the multiplication coefficient m3. The multiplier 8*d* multiplies the R channel digital audio signal 54 with the multiplication coefficient m4. The multiplier 8*e* multiplies the SR channel digital audio signal 55 with the multiplication coefficient m5. The multiplier 8*f* multiplies the LFE channel digital audio signal 50 with the multiplication coefficient m6. The digital audio signals 51 through 55 and 50 respectively correspond to the digital audio signals 31, 32, . . . 3*n* and 30 shown in FIG. 9.

The adder 9*a* adds output signals from the multipliers 8*a*, 8*b* and 8*c*, and outputs a digital audio signal 56 of an L channel (an L channel digital audio signal 56). The adder 9*b* adds output signals from the multipliers 8*c*, 8*d* and 8*e*, and outputs a digital audio signal 57 of an R channel (an R channel digital audio signal 57). The multiplier 8*f* outputs a digital audio signal 58 of an LFE channel (an LFE channel digital audio signal 58).

An exemplary general ratio of the multiplication coefficients is m1:m2:m3:m4:m5:m6 0.7:1.0:0.7:1.0:0.7:1.0. The ratio of the multiplication coefficients is changeable in accordance with characteristics of the input signal or the system. In the case where a signal which is to be input to the down-mixing signal processing section 3 is level-adjusted so as to avoid an overflow, the ratio of the multiplication coefficients can be the above-mentioned ratio. In the case where there is a possibility that down-mixing signal processing causes an overflow, the multiplication coefficients m1 through m6 need to be regulated in advance. In the case where the LFE, SL, L, C, R and SR channel digital audio signals 50, 51, 52, 53, 54 and 55 are not processed against an overflow, all the multiplication coefficients m1 through m6 further need to be regulated with 1/(2.4).

The L, R and LFE channel digital audio signals 56, 57 and 58 obtained by down-mixing signal processing are given to D/A converters 63, 64 and 65 shown in FIG. 9. The D/A converter 63 converts the L channel digital audio signal 56 into an analog audio signal 56' of an L channel (an L channel analog audio signal 56') and outputs the L channel analog audio signal 56'. The D/A converter 64 converts the R channel digital audio signal 57 into an analog audio signal 57' of an R channel (an R channel analog audio signal 57') and outputs the R channel analog audio signal 57'. The D/A converter 65 converts the LFE channel digital audio signal 58 into an analog audio signal 58' of an LFE channel (an LFE channel analog audio signal 58') and outputs the LFE channel analog audio signal 58'.

One D/A converter is required for each channel. Therefore, the signal processing apparatus 300 shown in FIG. 9 requires three D/A converters 63, 64 and 65. In most of the actual products, however, two D/A converters are packaged into one LSI. Where two such LSIs are incorporated into the signal processing apparatus 300, one D/A converter is not used. In addition, the D/A converters used for DVD players are mostly expensive in order to provide high quality sound.

When a user reproduces video or audio data using a DVD player, he/she often uses a speaker unit which is not of a surround system. Often times, he/she does not use the LFE channel. In a portable DVD player, a headphone speaker is often used for outputting the audio data, in which case, the LFE channel is not used. Furthermore, the output from the DVD player is often reproduced by a general TV receiver. A speaker unit of most of the TV receivers have only an L channel and an R channel and is not of a surround system. The LFE channel is not used.

In the conventional signal processing apparatus, one D/A converter is provided for each channel for converting a digital signal into an analog signal although often times the LFE channel is not used. In the case of a 2.1 channel output system, three D/A converters are required, which unnecessarily increases the cost.

SUMMARY OF THE INVENTION

According to one aspect of the invention, a signal processing apparatus includes a decoder for decoding a stream signal so as to generate a digital audio signal of a low frequency effect channel and digital audio signals of first through n'th (n≧2) channels, wherein the stream signal includes information of a low frequency effect channel, the information containing a low frequency component, and also includes information of the first through n'th channels, the information containing components of all frequency bands, the first through n'th channels having different sound source positions; an adder section for adding the digital audio signal of the low frequency effect channel and the digital audio signal of a specified channel among the first through n'th channels, so as to generate an addition signal; an n number of D/A conversion sections for converting the digital audio signals of the first through n'th channels, excluding the digital audio signal of the specified channel, and the addition signal into n types of analog audio signals; a first signal processing section for performing a first signal processing process of the analog audio signal obtained as a result of D/A conversion of the addition signal, so as to generate an analog audio signal of the low frequency effect channel; and a second signal processing section for performing a second signal processing process of the analog audio signal obtained as a result of D/A conversion of the addition signal, so as to generate an analog audio signal of the specified channel.

In one embodiment of the invention, the signal processing apparatus further includes a multiplication section for adjusting an amplitude of the digital audio signal of the low frequency effect channel generated by the decoder.

In one embodiment of the invention, the signal processing apparatus further includes a multiplication section for adjusting an amplitude of the digital audio signal of the specified channel generated by the decoder.

In one embodiment of the invention, the first signal processing process is a low pass filtering process.

In one embodiment of the invention, the second signal processing process is one of a high pass filtering process or an all pass filtering process.

In one embodiment of the invention, the second signal processing section includes a switching section for selecting one of the high pass filtering process and the all pass filtering process. The all pass filtering process is selected when a low frequency analog audio signal is output from the second signal processing section, and the high pass filtering process is selected when the low frequency analog audio signal is not output from the second signal processing section.

In one embodiment of the invention, n is 5, and the stream signal contains information of 5.1 channels.

According to another aspect of the invention, a signal processing apparatus includes a decoder for decoding a stream signal so as to generate a digital audio signal of a low frequency effect channel and digital audio signals of first through n'th (n≧2) channels, wherein the stream signal includes information of a low frequency effect channel, the information containing a low frequency component, and also includes information of the first through n'th channels, the information containing components of all frequency bands, the first through n'th channels having different sound source positions; a down-mixing signal processing section for converting the digital audio signals of the first through n'th channels into a digital audio signal of an L channel and a digital audio signal of an R channel; a first addition section for adding the digital audio signal of the low frequency effect channel and the digital audio signal of the L channel, so as to generate a first addition signal; a second addition section for adding the digital audio signal of the low frequency effect channel and the digital audio signal of the R channel, so as to generate a second addition signal; a first D/A conversion section for converting the first addition signal into a first analog audio signal; a second D/A conversion section for converting the second addition signal into a second analog audio signal; a third addition section for adding the first analog audio signal and the second analog audio signal so as to generate a third analog audio signal; a first signal processing section for performing a first signal processing process of the third analog audio signal so as to generate a fourth analog audio signal of the low frequency effect channel; a second signal processing section for performing a second signal processing process of the first analog audio signal so as to generate a fifth analog audio signal of the L channel; and a third signal processing section for performing third signal processing of the second analog audio signal so as to generate a sixth analog audio signal of the R channel.

In one embodiment of the invention, the signal processing apparatus further includes a multiplication section for adjusting an amplitude of the digital audio signal of the low frequency effect channel.

In one embodiment of the invention, the signal processing apparatus further includes at multiplication section for adjusting an amplitude of the digital audio signal of the L channel generated by the down-mixing signal processing section.

In one embodiment of the invention, the signal processing apparatus further includes a multiplication section for adjusting an amplitude of the digital audio signal of the R channel generated by the down-mixing signal processing section.

In one embodiment of the invention, the first signal processing process is a low pass filtering process.

In one embodiment of the invention, the second signal processing process is one of a high pass filtering process or an all pass filtering process.

In one embodiment of the invention, the second signal processing section includes a switching section for selecting one of the high pass filtering process and the all pass filtering process. The all pass filtering process is selected when a low frequency analog audio signal in output from the second signal processing section, and the high pass filtering process is selected when the low frequency analog audio signal is not output from the second signal processing section.

In one embodiment of the invention, the third signal processing is one of a high pass filtering process or an all pass filtering process.

In one embodiment of the invention, the third signal processing section includes a switching section for selecting one of the high pass filtering process and the all pass filtering process. The all pass filtering process selected when a low frequency analog audio signal is output from the third signal processing section, and the high pass filtering process is selected when the low frequency analog audio signal is not output from the third signal processing section.

In one embodiment of the invention, n is 5, and the stream signal contains information of 5.1 channels.

According to still another aspect of the invention, a signal processing method included the steps of decoding a stream signal so as to generate a digital audio signal of a low frequency effect channel and digital audio signals of first through n'th (n≧2) channels wherein the stream signal includes information of a low frequency effect channel, the information containing a low frequency component, and also includes information of the first through n'th channels, the information containing components of all frequency bands, the first through n'th channels having different sound source positions; adding the digital audio signal of the low frequency effect channel and the digital audio signal of a specified channel among the first through n'th channels, thereby generating an addition signal; converting the digital audio signals of the first through n'th channels, excluding the digital audio signal of the specified channel, and the addition signal into n types of analog audio signals; performing a first signal processing process of the analog audio signal obtained as a result of D/A conversion of the addition signal, thereby generating an analog audio signal of the low frequency effect channel; and performing a second signal processing process of the analog audio signal obtained as a result of D/A conversion of the addition signal, thereby generating an analog audio signal of the specified channel.

According to still another aspect of the invention, a signal processing method includes the steps of decoding a stream signal so as to generate a digital audio signal of a low frequency effect channel and digital audio signals of first through n'th (n≧2) channels, wherein the stream signal includes information of a low frequency effect channel, the information containing a low frequency component, and also includes information of the first through n'th channels, the information containing components of all frequency bands, the first through n'th channels having different sound source positions; down-mixing the digital audio signals of the first through n'th channels Into a digital audio signal of an L channel and a digital audio signal of an R channel; adding the digital audio signal of the low frequency effect channel and the digital audio signal of the L channel, thereby generating a first addition signal; adding the digital audio signal of the low frequency effect channel and the digital audio signal of the R channel, thereby generating a second addition signal; converting the first addition signal into a first analog audio signal; converting the second addition signal into a second analog audio signal; adding the first analog audio signal and the second analog audio signal, thereby generating a third analog audio signal; performing a first signal processing process of the third analog audio signal, thereby generating a fourth analog audio signal of the low frequency effect channel; performing a second signal processing process of the first analog audio signal, thereby generating a fifth analog audio signal of the L channel; and performing third signal processing of the second analog audio signal, thereby generating a sixth analog audio signal of the R channel.

According to still another aspect of the invention, a program for causing a computer to execute signal processing for converting a digital audio signal into an analog audio signal is provided. The signal processing includes the steps of decoding a stream signal so as to generate a digital audio signal of a low frequency effect channel and digital audio signals of first through n'th (n≧2) channels, wherein the stream signal includes information of a low frequency effect channel the information containing a low frequency component, and also includes information of the first through n'th channels, the information containing components of all frequency bands, the first through n'th channels having different sound source positions; adding the digital audio signal of the low frequency effect channel and the digital audio signal of a specified channel among the first through n'th channels, thereby generating an addition signal; converting the digital audio signals of the first through n'th channels, excluding the digital audio signal of the specified channel, and the addition signal into n types of analog audio signals; performing a first signal processing process of the analog audio signal obtained as a result of D/A conversion of the addition signal, thereby generating an analog audio signal of the low frequency effect channel; and performing a second signal processing process of the analog audio signal obtained as a result of D/A conversion of the addition signal, thereby generating an analog audio signal of the specified channel.

According to still another aspect of the invention, a program for causing a computer to execute signal processing for converting a digital audio signal into an analog audio signal is provided. The signal processing includes the steps of decoding a stream signal so as to generate a digital audio signal of a low frequency effect channel and digital audio signals of first through n'th (n≧2) channels, wherein the stream signal includes information of a low frequency effect channel, the information containing a low frequency component, and also includes information of the first through n'th channels, the information containing components of all frequency bands, the first through n'th channels having different sound source positions; down-mixing the digital audio signals of the first through n'th channels into a digital audio signal of an L channel and a digital audio signal of an R channel; adding the digital audio signal of the low frequency effect channel and the digital audio signal of the L channel, thereby generating a first addition signal; adding the digital audio signal of the low frequency effect channel and the digital audio signal of the R channel, thereby generating a second addition signal; converting the first addition signal into a first analog audio signal; converting the second addition signal into a second analog audio signal; adding the first analog audio signal and the second analog audio signal, thereby generating a third analog audio signal, performing a first signal processing process of the third analog audio signal, thereby generating a fourth analog audio signal of the low frequency effect channel; performing a second signal processing process of the first analog audio signal, thereby generating a fifth analog audio signal of the L channel; and performing third signal processing of the second analog audio signal, thereby generating a sixth analog audio signal of the R channel.

According to still another aspect of the invention, a computer-readable recording medium having a program, recorded thereon, for causing a computer to execute signal processing for converting a digital audio signal into an analog audio signal is provided. The signal processing includes the steps of decoding a stream signal so as to generate a digital audio signal of a low frequency effect channel and digital audio signals of first through n'th (n≧2) channels, wherein the stream signal includes information of a low frequency effect channel, the information containing a low frequency component, and also includes information of the first through n'th channels, the information containing components of all frequency bands, the first through n'th channels having different sound source positions; adding the digital audio signal of the low frequency effect channel and the digital audio signal of a specified channel among the first through n'th channels, thereby generating an addition signal; converting the digital audio signals of the first through n'th channels, excluding the digital audio signal of the specified channel, and the addition signal into n types of analog audio signals; performing a first signal processing process of the analog audio signal obtained as a result of D/A conversion of the addition signal, thereby generating an analog audio signal of the low frequency effect channel; and performing a second signal processing process of the analog audio signal obtained as a result of D/A conversion of the addition signal, thereby generating an analog audio signal of the specified channel.

According to still another aspect of the invention, a computer-readable recording medium having a program, recorded thereon, for causing a computer to execute signal processing for converting a digital audio signal into an analog audio signal is provided. The signal processing includes the steps of decoding a stream signal so as to generate a digital audio signal of a low frequency effect channel and digital audio signals of first through n'th (n≧2) channels, wherein the stream signal includes information of a low frequency effect channel, the information containing a low frequency component, and also includes information of the first through n'th channels, the information containing components of all frequency bands, the first through n'th channels having different sound source positions; down-mixing the digital audio signals of the first through n'th channels into a digital audio signal of an L channel and a digital audio signal of an R channel; adding the digital audio signal of the low frequency effect channel and the digital audio signal of the L channel, thereby generating a first addition signal; adding the digital audio signal of the low frequency effect channel and the digital audio signal of the R channel, thereby generating a second addition signal; converting the first addition signal into a first analog audio signal; converting the second addition signal into a second analog audio signal; adding the first analog audio signal and the second analog audio signal, thereby generating a third analog audio signal; performing a first signal processing process of the third analog audio signal, thereby generating a fourth analog audio signal of the low frequency effect channel; performing a second signal processing process of the first analog audio signal, thereby generating a fifth analog audio signal of the L channel; and performing third signal processing of the second analog audio signal, thereby generating a sixth analog audio signal of the R channel.

Thus, the invention described herein makes possible the advantages of providing (1) a signal processing apparatus and a signal processing method for reproducing multi-channel audio signals with a low cost circuit configuration as a result of reducing the number of D/A converters used for converting multi-channel digital audio signals into analog audio signals, and for assigning a channel for outputting an analog audio signal of an LFE channel; and (2) a program for executing such signal processing and a recording medium used for recording the program.

These and other advantages of the present invention will become apparent to those skilled in the art upon reading and understanding the following detailed description with reference to the accompanying figures.

DESCRIPTION OF THE EMBODIMENTS

Figure 1A:
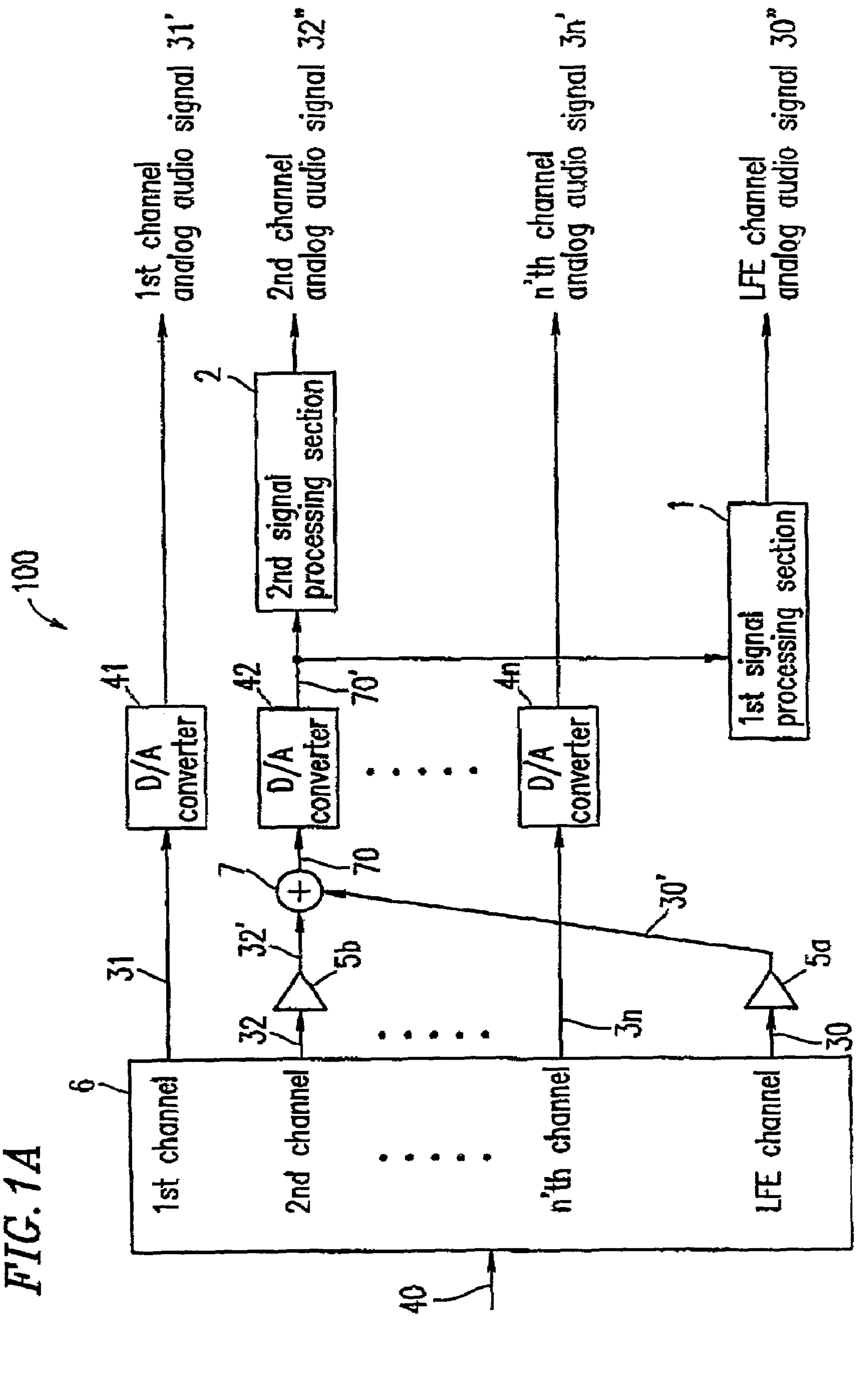
FIG. 1A shows a structure of a signal processing apparatus according to a first example of the present invention.

Hereinafter, the present invention will be described by way of illustrative examples with reference to the accompanying drawings. Identical elements in different examples bear identical reference numerals.

EXAMPLE 1

FIG. 1A shows a signal processing apparatus 100 according to a first example of the present invention. The signal-processing apparatus 100 includes a first signal processing section 1, a second signal processing section 2, D/A converters 41, 42, . . . **4*n*, multipliers 5*a* and 5*b*, a decoder 6 and an adder 7**.

Figure 1B:
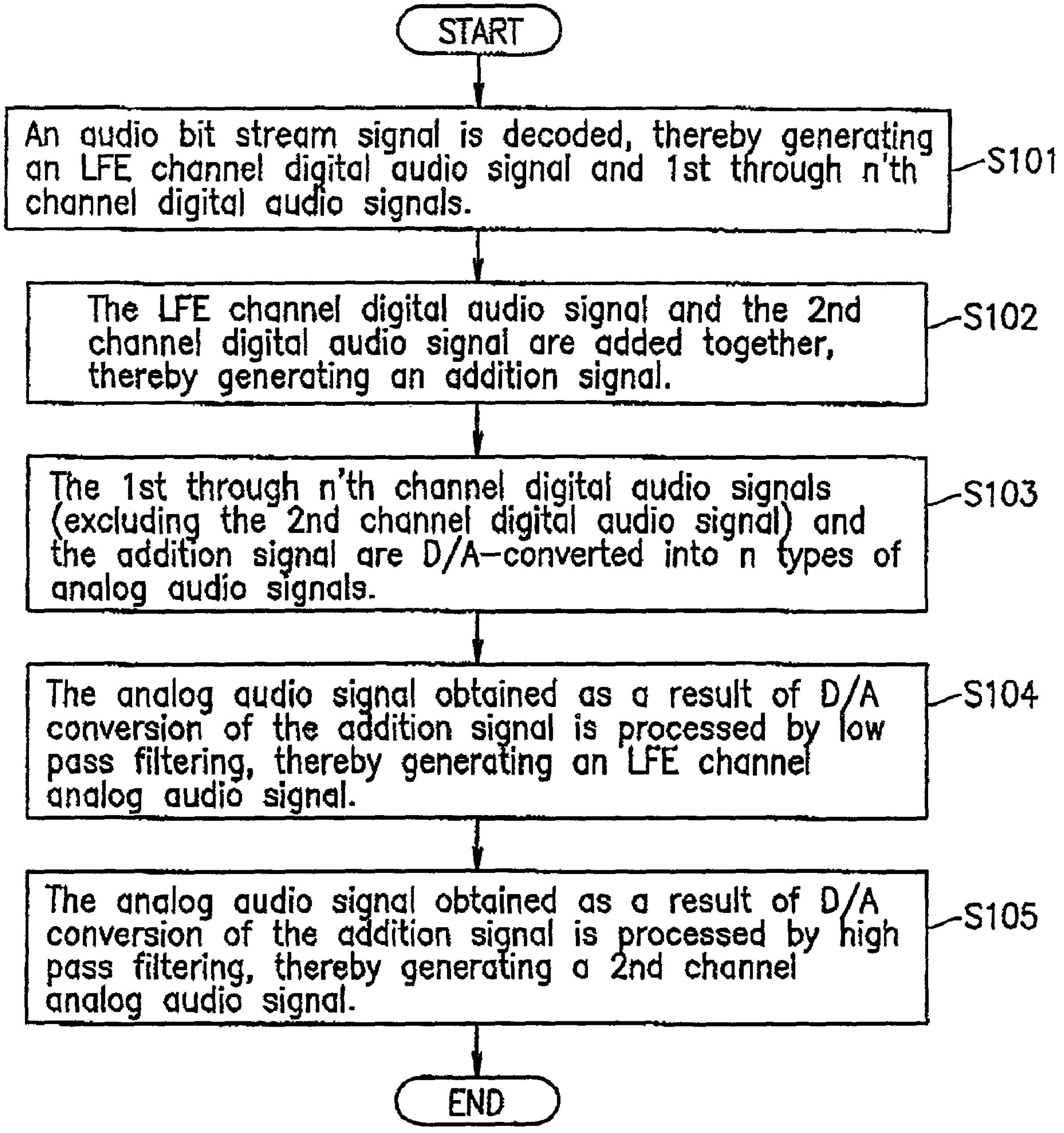
FIG. 1B is a flowchart illustrating a signal processing method according to the first example.

FIG. 1B is a flowchart illustrating an operation of the signal processing apparatus 100 shown in FIG. 1A.

The operation of the signal processing apparatus 100 will be described with reference to FIG. 1B.

S101: The decoder 6 receives an audio bit stream signal 40 from an external device. The audio bit stream signal 40 includes information of an LFE channel, the information containing a low frequency component, and information of first through n'th (n≧2) channels, the information containing components of all the frequency bands. The first through n'th channels have different sound source positions. The decoder 6 decodes the audio bit stream signal 40 into a digital audio signal (linear PCM). Then, decoder 6 separates the digital audio signal into a digital audio signal 31 of a first channel (a first channel digital audio signal 31), a digital audio signal 32 of a second channel (a second channel digital audio signal 32), a digital audio signal **3*n* of an n'th channel (an n'th channel digital audio signal 3*n*), and a digital audio signal 30 of an LFE channel (an LFE channel digital audio signal 30). In the first and second examples of the present invention, reference numeral "3*n***" can be any number in the range of 33 through 39. According to the present invention, the number of the channels is any integer of two or greater.

The multiplier **5*a* multiplies the LFE channel digital audio signal 30 with a multiplication coefficient M1 and outputs a digital audio signal 30'. The multiplier 5*b* multiplies the second channel digital audio signal 32 with a multiplication coefficient M2 and outputs a digital audio signal 32'**. The second channel is defined as a specified channel.

S102: The adder 7 adds the digital audio signal 30' and the digital audio signal 32' and outputs a digital audio signal 70 as an addition signal.

S103: The D/A converter 42 converts the digital audio signal 70 into an analog audio signal 70'. The D/A converters 41 through 4*n* (excluding the D/A converter 42) respectively convert the first through n'th digital audio signals 31 through 3*n* (excluding the second digital audio signal 32) into (n−1) types of analog audio signals 31' through 3*n'* (excluding 32').

S104: The first signal processing section 1 includes a low pass filter (LPF; not shown in FIG. 1A), and thus performs low pass filtering of the analog audio signal 70' so as to extract a low frequency component. Then, the first signal processing section 1 outputs an analog audio signal 30" of an LFE channel (an LFE channel analog audio signal 30").

S105: The second signal processing section 2 includes a high pass filter (HPF; not shown in FIG. 1A), and thus performs high pass filtering of the analog audio signal 70' so as to extract a high frequency component. Then, the second signal processing section 2 outputs an analog audio signal 32" of the second channel (a second channel analog audio signal 32").

The operation of the signal processing apparatus 100 will be described in more detail.

The audio bit stream signal 40 contains multi-channel information. The multi-channel information includes information of the LFE channel for reproducing a low frequency component and information of general channels for reproducing frequency components of all the frequency bands. In the case where the number of channels is 5.1, the number of general channels is 5. The information of the LFE channel mainly contains a low frequency component as a frequency component, but can substantially contain only the low frequency component. The frequency band for a low frequency component is defined for each coding system. For example, the frequency band for a low frequency component is 120 Hz or lower in the case of the Dolby Digital system, and 240 Hz or lower in the case of the DTS (Digital Theater Systems). The information of the first through n'th channel contains the Information of all the frequency bands to be reproduced which are defined for each coding system. The information of the first through n'th channel contains at least a component of a frequency band which is equal to or higher than the frequency band having a low frequency component.

In the first example, the first through n'th channel are general channels. In the following description, n=5, the first channel is an L channel, the second channel is a C channel, the third channel is an R channel, the fourth channel is an SL channel, and the fifth channel is an SR channel. In the first example, the specified channel signal which is added with the signal of the LFE channel is the second channel signal, but a similar effect is obtained whichever channel signal is added with the signal of the LFE channel. The LFE channel signal can be added to signals of a plurality of general channels.

As described above, the audio bit stream signal 40 of the 5.1 channels is decoded by the decoder 6 and separated into the first through fifth channel digital audio signals 31 through 35 and the LFE channel digital audio signal 30. Also described above, the LFE channel digital audio signal 30 is multiplied with the multiplication coefficient M1 by the multiplier 5*a*, and the second channel digital audio signal 32 is multiplied with the multiplication coefficient M2 by the multiplier 5*b*. The values of M1 and M2 are arbitrarily determined in each embodiment of the present invention. The digital audio signals 30' and 32' obtained by the multiplication are added together by the adder 7.

The second channel digital audio signal 32 may possibly contain a signal of a frequency component which is the same as the low frequency component. Therefore, the multiplication coefficients M1 and M2 are preferably determined so that the addition result obtained by the adder 7 does not overflow.

In the case where the amplitudes of the second channel digital audio signal 32 and the LFE channel digital audio signal 30 are adjusted by the decoder 6 or the like in order to avoid an overflow, the multipliers 5*a* and 5*b* can be eliminated.

The digital audio signal 70 obtained as a result of the addition of the digital audio signal 30 and the digital audio signal 32 by the adder 7 is input to the D/A converter 42 and converted into the analog audio signal 70'. In parallel, the first through fifth channel digital audio signals 31 through 35 (excluding the second channel digital audio signal 32) are respectively input to the D/A converters 41 through 45 (excluding the D/A converter 42) and converted into analog audio signals 31' through 35' (excluding 32').

The analog audio signals 31' through 35' (excluding 32') are output without being processed. The analog audio signal 70' from the D/A converter 42 is input to the first signal processing section 1 and the second signal processing section 2.

Figure 3:
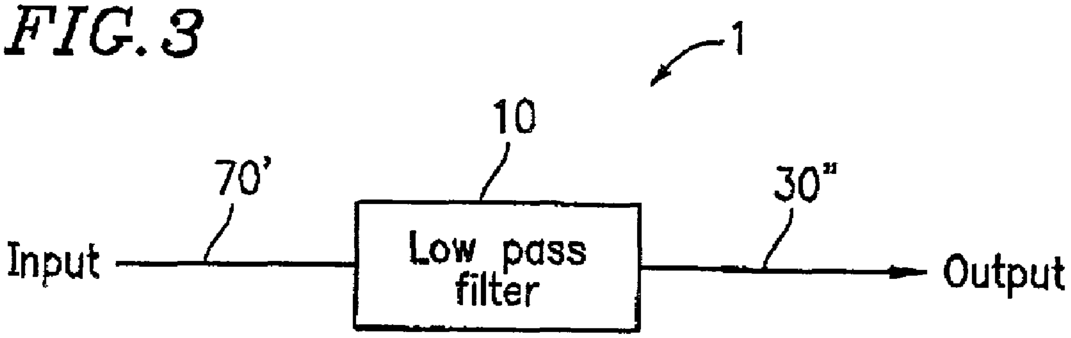
FIG. 3 shows a structure of a first signal processing section of a signal processing apparatus according to the present invention.
Figure 4:
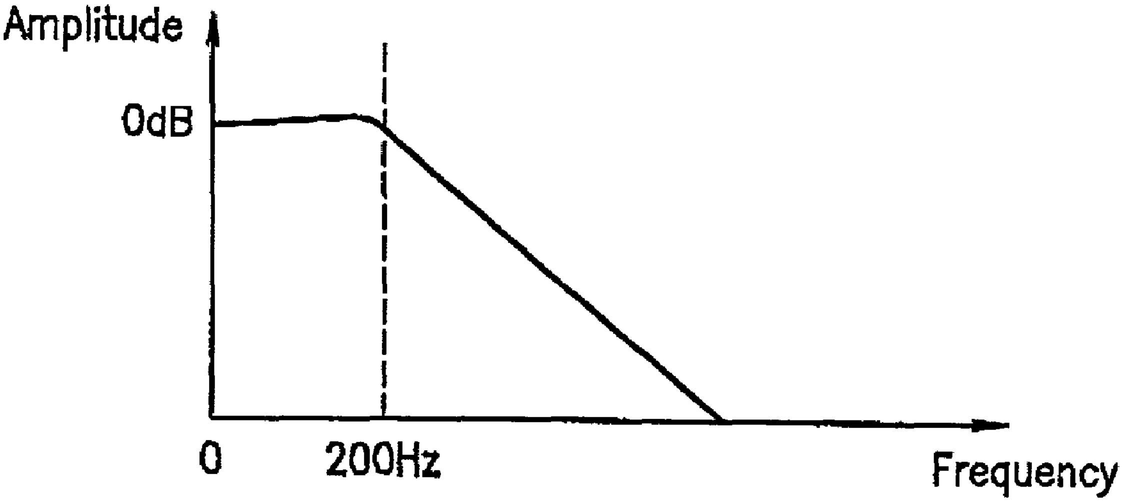
FIG. 4 is a graph illustrating a frequency characteristic of the first signal processing section shown in FIG. 3.

FIG. 3 shown a structure of the first signal processing section 1. The first signal processing section 1 includes a low pass filter (LPF) 10 shown in FIG. 3. FIG. 4 shows an exemplary frequency characteristic of the LPF 10. When realized by an analog circuit, the LPF 10 has a circuit configuration shown in FIG. 5. The LPF 10 includes an operational amplifier 11, resistors R1 and R2, and capacitors C1 and C2. The capacitor C1 is provided in a feedback section.

The first signal processing section 1 extracts a low frequency component from the analog audio signal 70' using the LPF 10 described above, and outputs the LFE channel analog audio signal 30". More specifically, the LPF 10 removes a high frequency component (a frequency component of about 200 Hz or higher shown in FIG. 4) of the analog audio signal 70'. In this specification, removal of a high frequency component includes attenuation of the high frequency component. The frequency component which is removed by the LPF 10 is preferably a frequency component of about 200 Hz or higher, but is not limited to this. An input section or an output section of the LPF 10 of the first signal processing section 1 can include a level adjuster.

Figure 6:
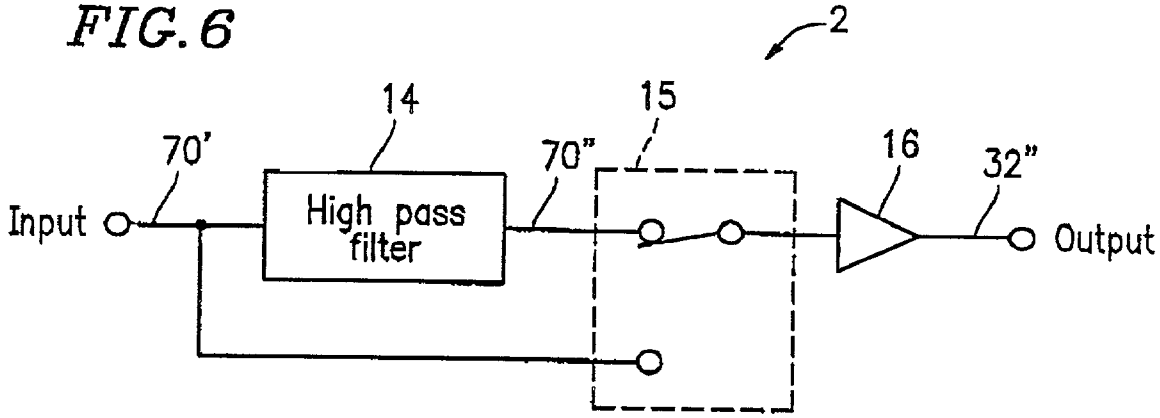
FIG. 6 shows a structure of a second signal processing section of a signal processing apparatus according to the present Invention.
Figure 7:
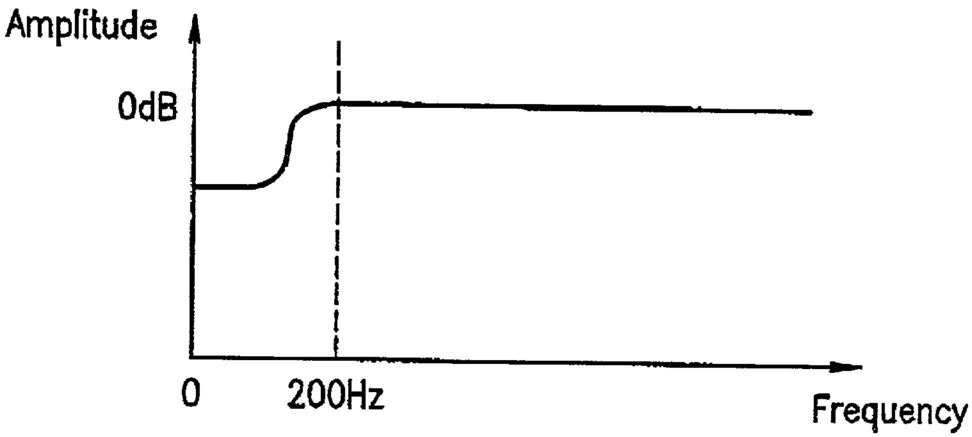
FIG. 7 is a graph illustrating a frequency characteristic of the second signal processing section show in FIG. 6.

The second signal processing section 2 generates the second channel analog audio signal 32" from the analog audio signal 70' in accordance with the values of the multiplication coefficients M1 and M2. FIG. 6 shows a structure of the second processing section 2. As shown in FIG. 6, the second processing section 2 includes a high pass filter (HPF) 14, an output switch 16, and a multiplier 16. FIG. 7 shows an exemplary characteristic of the HPF 14. When realized by an analog circuit, the HPF 14 has a circuit configuration shown in FIG. 7. The HPF 14 includes an operational amplifier 12, resistors R3 and R4, and capacitors C3 and C4. The resistor R3 is provided in a feedback section.

The analog audio signal 70' which is input to the second processing section 2 is given to the HPF 14 and the output switch 15. The HPF 14 removes a low frequency component (a frequency component of about 200 Hz or lower shown in FIG. 4) of the analog audio signal 70' and thus generates an analog audio signal 70". In this specification, removal of a low frequency component includes attenuation of the low frequency component. The frequency component which is removed by the HPF 14 is preferably a frequency component of about 200 Hz or lower, but is not limited to this. The analog audio signal 70" output from the HPF 14 is input to the output switch 15. The output switch 15 selects the analog audio signal 70' or the analog audio signal 70" in accordance with settings performed by an external device, and outputs the selected signal to the multiplier 16. The multiplier 16 multiplies the selected signal with a multiplication coefficient M3 (=1/M2), and outputs the result as the second channel analog audio signal 32".

The signal processing apparatus 100 in the first example can be either in a mode of outputting the LFE channel analog audio signal 30" or in a mode of not outputting the LFE channel analog audio signal 30". In the case where a speaker for an LFE channel is available, the first signal processing section 1 outputs the LFE channel analog audio signal 30". In this case, the output switch 15 of the second signal processing section 2 can select and output the analog audio signal 70" from the HPF 14. The analog audio signal 70" is supplied to a speaker for the C channel (second channel) via the multiplier 16.

In the case where no speaker for an LFE channel is available, the first signal processing section 1 does not output the LFE channel analog audio signal 30". In the case where the speaker for the C channel can reproduce a low frequency component, the output switch 15 selects the analog audio signal 70". Thus, a sound which is supposed to be output from the C channel and a low frequency sound having little directivity can be simultaneously output from the speaker for the C channel. In the case where the speaker for the C channel cannot reproduce a low frequency component due to the system design, the output switch 15 selects the analog audio signal 70". Thus, the analog audio signal 70" having the low frequency component removed therefrom can be output to the speaker for the C channel.

As described above, the multiplier 16 multiplies the signal from the output switch 15 with the multiplication coefficient M3. In order to keep satisfactory balance between the analog audio signal 32", and the other channel analog audio signals 31' through **3*n*' (excluding 32') and 30", the multiplication coefficient M3 is set to be 1/M2. In the first example, the multiplier 16 is provided at a stage after the output switch 15, but can be provided at a stage before the second signal processing section 2**. Substantially the same effect is provided.

In the first example, a low frequency component of the analog audio signal 70' (including a low frequency component contained In the digital audio signal 32 and a low frequency component contained in the digital audio signal 30) is extracted by the first signal processing section 1 and is output as the LFE channel analog audio signal 30". Accordingly, in the case where a speaker for an LFE channel is available, the low frequency component of the analog audio signal 70' can be output from the speaker for the LFE channels Since a low frequency sound has little directivity, the overall sound quality is not substantially influenced by which speaker outputs the low frequency sound.

In the first example, as described above, an LFE channel digital audio signal obtained as a result of being multiplied with a multiplication coefficient is added to a signal of a specified channel, which is also obtained as a result of being multiplied with a multiplication coefficient. The resultant signal is D/A-converted, and then an LFE channel analog audio signal is generated by a low pass filter. Due to such a structure, a D/A converter for an LFE channel can be eliminated without spoiling the sound quality. In the first example, n+1 types of digital audio signals can be converted into n types of analog audio signals by an n number of D/A converters. In this case, a low pass filter and a high pass filter are required. Since it is sufficient that the low pass filter and the high pass filter have mild frequency characteristics, the signal processing apparatus can be produced at significantly lower cost as compared to the apparatus Including a D/A converter for an LFE channel.

Example 2

Figure 2A:
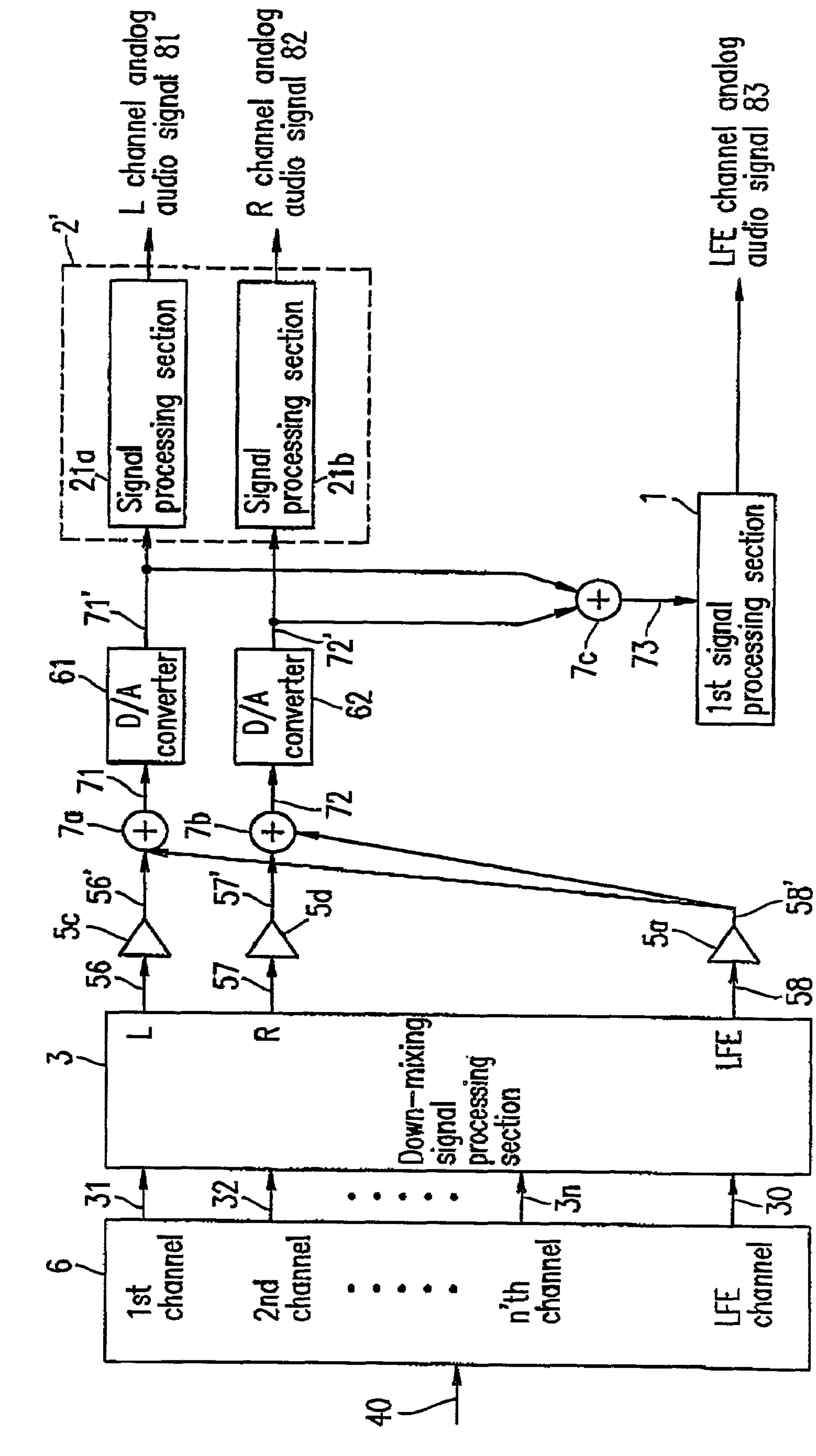
FIG. 2A shows a structure of a signal processing apparatus according to a second example of the present invention.

FIG. 2A shows a signal processing apparatus 200 according to a second example of the present invention. The signal processing apparatus 200 includes a first signal is processing section 1, a second signal processing section 2', a down-mixing signal processing section 3, D/A converters 61 and 62, multipliers **5*a*, 5*c* and 5*d*, a decoder 6 and adders 7*a*, 7*b* and 7*c***.

Figure 9:
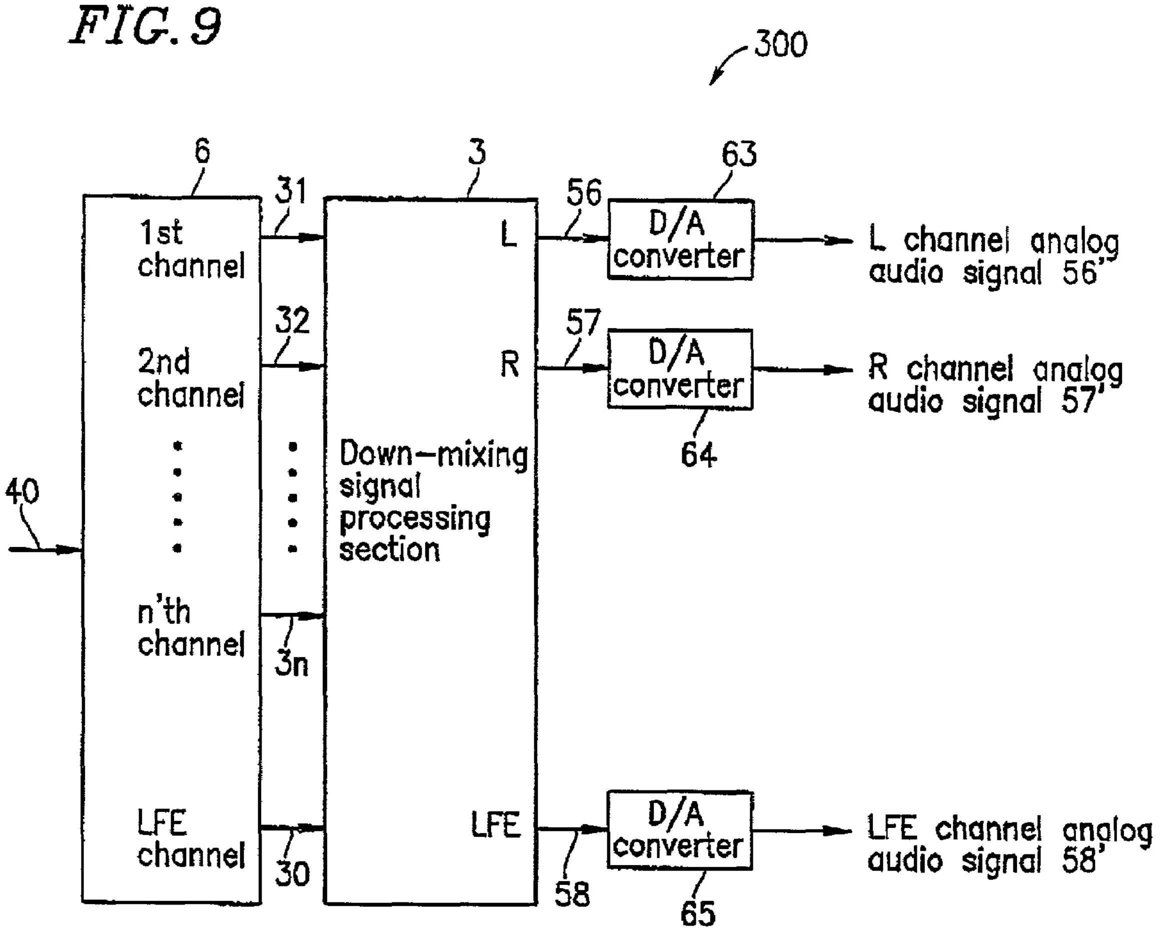
FIG. 9 shows a structure of a conventional signal processing apparatus.
Figure 10:
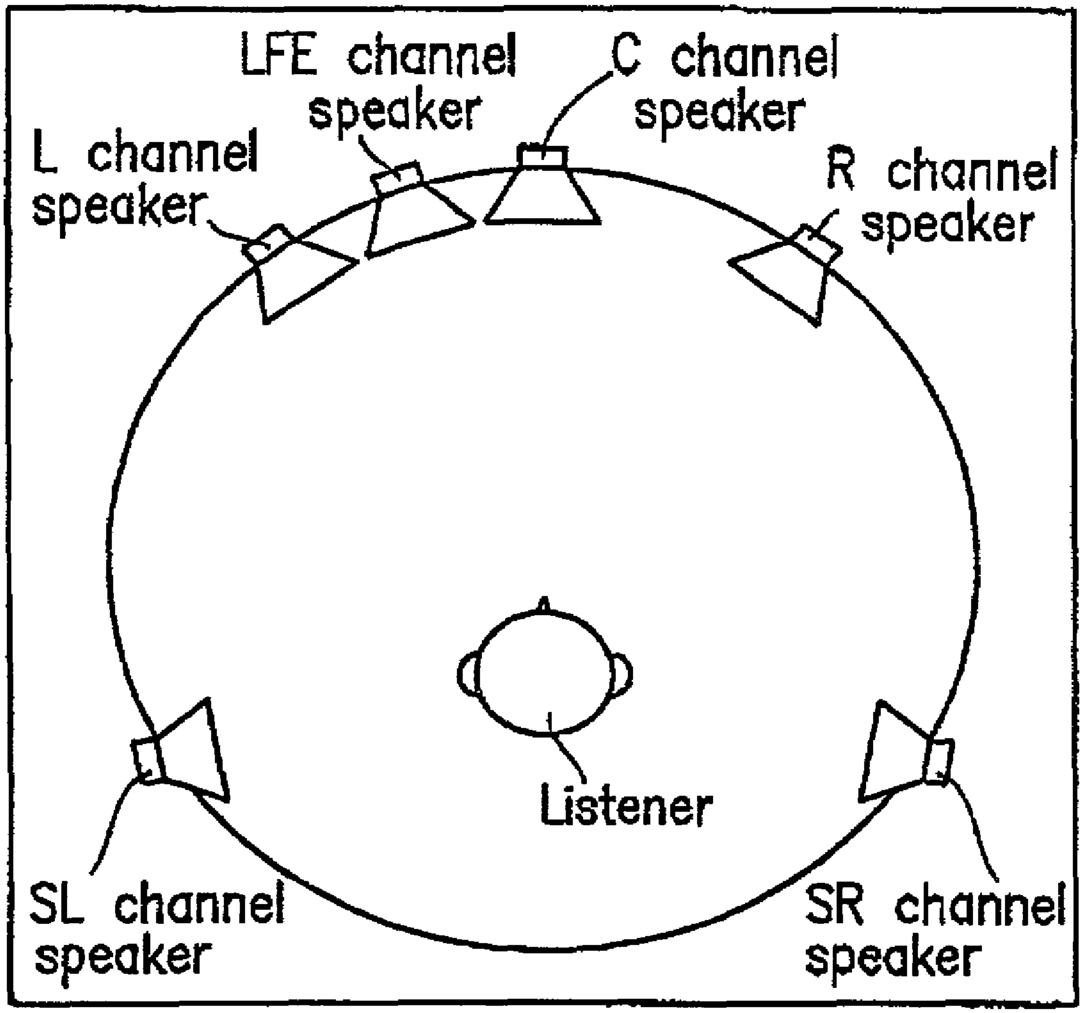
FIG. 10 shows an arrangement of a speaker unit of a multi-channel system.

The signal processing apparatus 200 can execute signal processing with the two D/A converters 61 and 62 and thus can reduce the number of D/A converters as compared to the conventional signal processing apparatus 300 shown in FIG. 9, which requires three D/A converters.

Figure 2B:
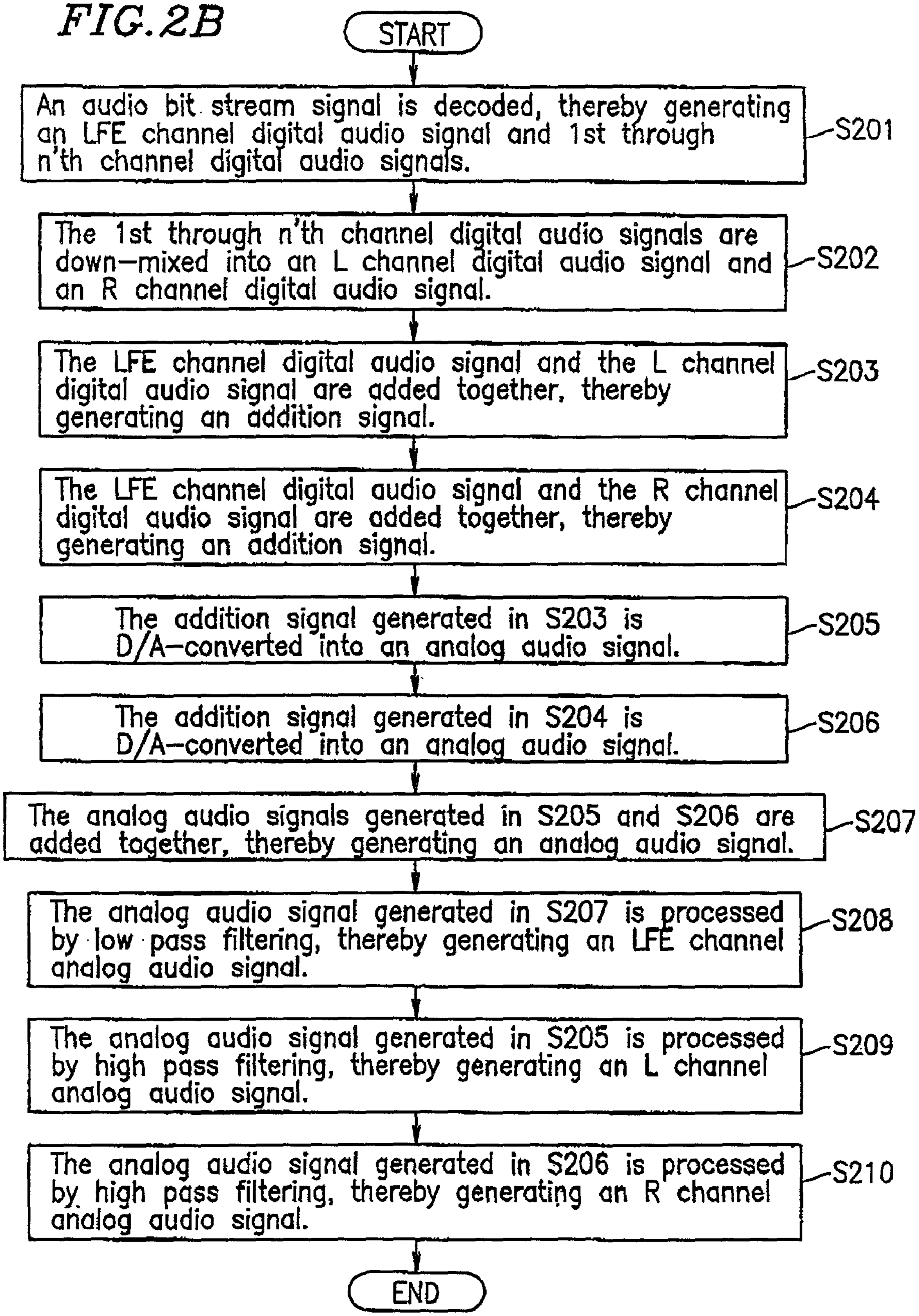
FIG. 2B is a flowchart illustrating a signal processing method according to the second example.

FIG. 2B is a flowchart illustrating an operation of the signal processing apparatus 200 shown in FIG. 2A.

The operation of the signal processing apparatus 200 will be described with reference to FIG. 2B.

S201: The decoder 6 receives an audio bit stream signal 40 from an external device. The decoder 6 decodes the audio bit stream signal 40 into a digital audio signal (linear PCM). Then, decoder 6 separates the digital audio signal into a first channel digital audio signal 31, a second channel digital audio signal 32, . . . an n'th ($n \geqq 2$) channel digital audio signal **3*n*, and an LFE channel digital audio signal 30**. In the case of a 5.1 channel system, n=5.

S202: The down-mixing signal processing section 3 receives the digital audio signals 31, 32, . . . **3*n* and 30** and performs down-mixing signal processing.

Figure 11:
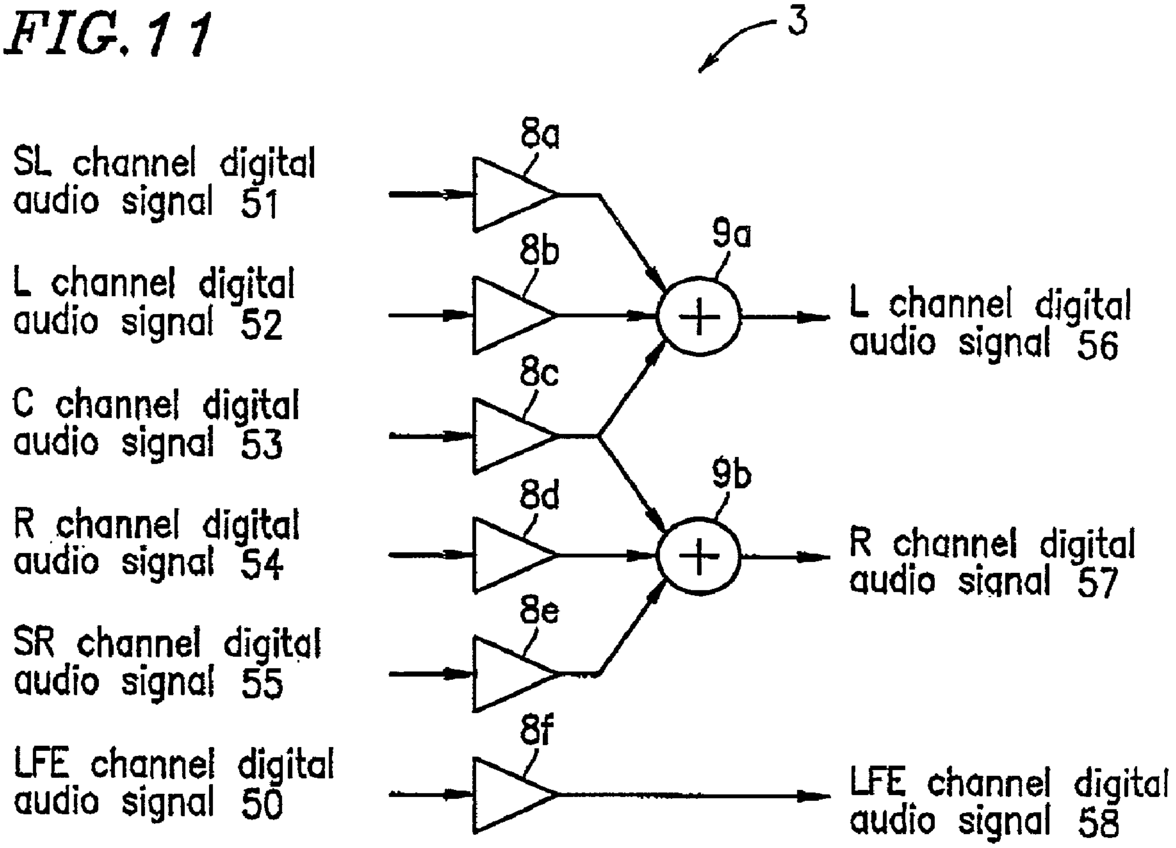
FIG. 11 shows down-mixing signal processing procedure used by the conventional signal processing apparatus and a signal processing apparatus according to the present invention.

Down-mixing signal processing can be performed in various manners. In the case of the 5.1 channel system, the down-mixing signal processing section 3 performs, for example, down-mixing signal processing described above with reference to FIG. 11. As described above, the down-mixing signal processing section 3 receives the digital audio signals 31, 32 . . . **3*n* and 30 (corresponding to the digital audio signals 51 through 55 and 50) and performs down-mixing signal processing using the multipliers 8*a*, 8*b*, 8*c*, 8*d*, 8*e* and 8*f* and adders 9*a* and 9*b*. As a result, the down-mixing signal processing section 3 outputs an L channel digital audio signal 56, an R channel digital audio signal 57, and an LFE channel digital audio signal 58**.

The multiplier **5*a* performs amplitude adjustment by multiplying the LFE channel digital audio signal 58 from the down-mixing signal processing section 3 with a multiplication coefficient M1 and outputs a digital audio signal 58'. The multiplier 5*c* performs amplitude adjustment by multiplying the L channel digital audio signal 56 from the down-mixing signal processing section 3 with a multiplication coefficient M4 and outputs a digital audio signal 56'. The multiplier 5*d* performs amplitude adjustment by multiplying the R channel digital audio signal 57 from the down-mixing signal processing section 3 with a multiplication coefficient M4 and outputs a digital audio signal 57'**.

S203: The adder 7*a* adds the digital audio signal 58' and the digital audio signal 56' and outputs a digital audio signal 71 as an addition signal.

S204: The adder 7*b* adds the digital audio signal 58' and the digital audio signal 57' and outputs a digital audio signal 72 as an addition signal.

S205: The D/A converter 61 converts the digital audio signal 71 into an analog audio signal 71'.

S206: The D/A converter 62 converts the digital audio signal 72 into an analog audio signal 72'.

S207: The adder 7*c* adds the analog audio signal 71' from the D/A converter 61 and the analog audio signal 72' from the D/A converter 62, and outputs an analog audio signal 73 as an addition result.

S208: The first signal processing section 1 includes an LPF, and thus performs low pass filtering of the analog audio signal 73 from the adder 7*c* so as to extract a low frequency component and outputs an analog audio signal 83 of an LFE channel (an LFE channel analog audio signal 83).

The second signal processing section 2' includes signal processing sections 21*a* and 21*b*. The signal processing sections 21*a* and 21*b* each includes an HPF.

S209: The signal processing section 21*a* performs high pass filtering of the analog audio signal 71' from the D/A converter 61 so as to remove a low frequency component and thus outputs an analog audio signal 81 of an L channel (an L channel analog audio signal 81).

S210: The signal processing section 21*b* performs high pass filtering of the analog audio signal 72' from the D/A converter 62 so as to remove a low frequency component and thus outputs an analog audio signal 82 of an R channel (an R channel analog audio signal 82).

The operation of the signal processing apparatus 200 will be described in more detail. In the following description, the signal processing apparatus 200 decodes a 5.1 channel audio bit stream and outputs analog audio signals of 2.1 channels.

As in the first example, the audio bit stream signal 40 contains multi-channel information. The multi-channel information includes information of a low frequency effect channel for reproducing a low frequency component and information of general channels for reproducing frequency components of all the frequency bands. In the case where the number of channels is 5.1, the number of general channels is 5. In the first example, the first through n'th channel are general channels. In the following description, n=5, the first channel is an L channel, the second channel is a C channel, the third channel is an R channel, the fourth channel is an SL channel, and the fifth channel is an SR channel.

The audio bit stream signal 40 of the 5.1 channels is decoded by the decoder 6 and separated into the first through fifth channel digital audio signals 31 through 35 and the LFE channel digital audio signal 30. The down-mixing signal processing section 3 receives the digital audio signals 31 through 35 and 30 (corresponding to the digital audio signals 51 through 55 and 50), and performs down-mixing signal processing, for example, as described above with reference to FIG. 11 using the multipliers 8*a* through 8*f* and adders 9*b* and 9*b*. Thus, the down-mixing signal processing section 3 outputs the L channel digital audio signal 56, the R channel digital audio signal 57 and the LFE channel digital audio signal 58.

The LFE channel digital audio signal 58 from the down-mixing signal processing section 3 is multiplied with the multiplication coefficient M1 by the multiplier 5*a*. The multiplier 5*a* outputs the digital audio signal 58'. The L channel digital audio signal 56 from the down-mixing signal processing section 3 is multiplied with the multiplication coefficient M4 by the multiplier 5*c*. The multiplier 5*c* outputs the digital audio signal 56'. The R channel digital audio signal 57 from the down-mixing signal processing section 3 is multiplied with the multiplication coefficient M4 by the multiplier 5*d*. The multiplier 5*d* outputs the digital audio signal 57'. The digital audio signals 56' from the multiplier 5*c* and the digital audio signals 58' from the multiplier 5*a* are added together by the adder 7*a*, and the adder 7*a* outputs the digital audio signal 71. The digital audio signals 57' from the multiplier 5*d* and the digital audio signals 58' from the multiplier 5*a* are added together by the adder 7*b*, and the adder 7*b* outputs the digital audio signal 72.

The values of M1 and M4 are arbitrarily determined in each embodiment of the present invention. The L and R channel digital audio signals 56 and 57 may possibly contain a signal of a frequency component which is the same as the LFE channel digital audio signal 58. Therefore, the multiplication coefficients M1 and M4 are preferably determined so that the addition results obtained by the adders 7*a* and 7*b* do not overflow.

The digital audio signal 71 from the adder 7*a* and the digital audio signal 72 from the adder 7*b* are respectively input to the D/A converters 61 and 62 and converted into the analog audio signals 71' and 72'. The analog audio signals 71' and 72' are given to the adder 7*c* and the second signal processing section 2'. The adder 7*c* adds the analog audio signals 71' and 72', and outputs the analog audio signal 73. The analog audio signal 73 is given to the first signal processing section 1.

Figure 5:
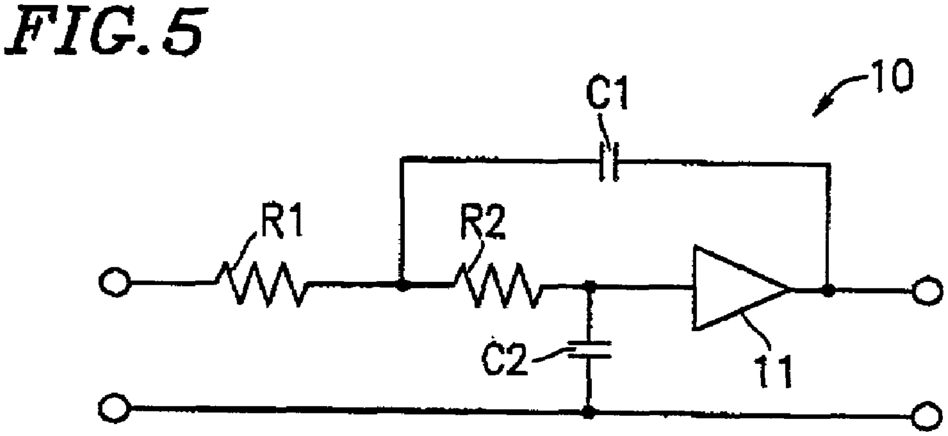
FIG. 5 shows a circuit configuration of the first signal processing section shown in FIG. 3 which is realized by an analog circuit.

The first signal processing section 1 includes an LPF 10 described in the first example with reference to FIG. 3, 4 and 5. The first signal processing section 1 has the characteristics and performs the operation described in the first example except for receiving and outputting different types of signals from those of the first example. In the second example,the first signal processing section 1 receives the analog audio signal 73, extracts a low frequency component, and outputs the LFE channel analog audio signal 83.

The signal processing section 21*a* of the second signal processing section 2' generates the L channel analog audio signal 81 from the analog audio signal 71' in accordance with the values of the multiplication coefficients M1 and M4. The signal processing section 21*b* of the second signal processing section 2' generates the R channel analog audio signal 82 from the analog audio signal 72' in accordance with the values of the multiplication coefficients M1 and M4.

Figure 8:
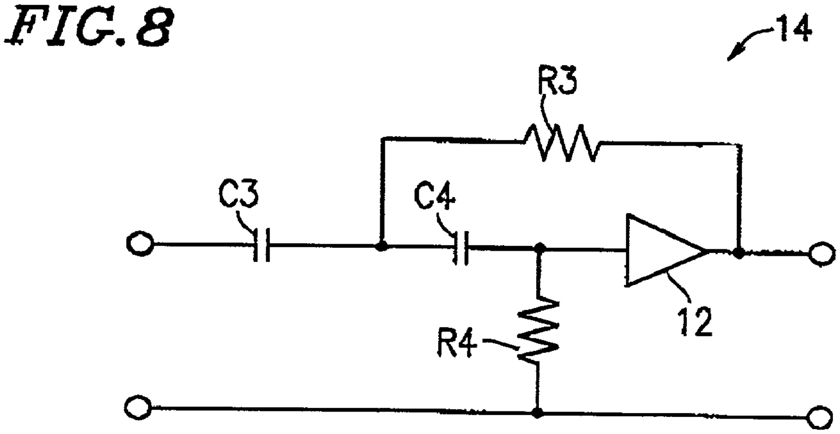
FIG. 8 shows a circuit configuration of the second signal processing section shown in FIG. 6 which is realized by an analog circuit.

Referring to FIG. 6, the signal processing sections 21*a* and 21*b* each include an HPF 14, an output switch 15 and a multiplier 16. The signal processing sections 21*a* and 21*b* each have the characteristics and performs the operation described in the first example regarding the second signal processing section 2 with reference to FIG. 6, 7 and 8 except for receiving and outputting different types of signals from those of the first example.

As in the second processing section 2 in the first example, the analog audio signal 71' which is input to the signal processing section 21*a* is given to the HPF 14 and the output switch 15. The HPF 14 removes a low frequency component of the analog audio signal 71'. The output switch 15 selects the analog audio signal 71' or the output from the HPF 14 In accordance with settings performed by an external device, and outputs the selected signal to the multiplier 16. The multiplier 16 multiplies the selected signal with a multiplication coefficient M5 (=1/M4), and outputs the result as the L channel analog audio signal 81. The analog audio signal 72' which is input to the signal processing section 21*b* is given to the HPF 14 and the output switch 15. The HPF 14 removes a low frequency component of the analog audio signal 72'. The,output switch 15 selects the analog audio signal 72' or the output from the HPF 14 in accordance with settings performed by an external device, and outputs the selected signal to the multiplier 16. The multiplier 16 multiplies the selected signal with a multiplication coefficient M5 (=1/M4), and outputs the result as the R channel analog audio signal 82.

The signal processing apparatus 200 in the second example can be either in a mode of outputting the LFE channel analog audio signal 83 or in a mode of not outputting the LFE channel analog audio signal 83. In the case where the LFE channel analog audio signal 83 is output from a normal LFE channel speaker or any other appropriate surround speaker unit, the output switch 15 of each of the signal processing sections 21*a* and 21*b* can select the output from the HPF 14, and output the selected signal to the multiplier 16.

In the case where no normal LFE channel speaker or no other appropriate surround speaker unit is available (i.e., in the case where the LFE channel analog audio signal 83 is not output) and further the speakers for the L and R channels can reproduce a low frequency component, the output switches 15 of the signal processing sections 21*a* and 21*b* select the analog audio signals 71' and 72'. Thus, a low frequency sound can be output from the speakers for the L and R channels. In the case where none of the speakers for the L and R channels can reproduce a low frequency component due to the system design, the output switches 15 of the signal processing sections 21*a* and 21*b* can select the outputs from the HPFs 14 so as to output the analog audio signals 81 and 82 having the low frequency components removed therefrom.

The multiplier 16 of each of the signal processing sections 21*a* and 21*b* multiplies the signal from the output switch 15 with the multiplication coefficient M5. In order to keep satisfactory balance between the analog audio signals which are output from the channels of the signal processing apparatus 200, the multiplication coefficient M5 is set to be 1/M4. In the second example, the multiplier 16 is provided at a stage after the output switch 15, but can be provided at a stage before the second signal processing sections 21*a* and 21*b*. Substantially the same effect is provided.

In the second example, a low frequency component of each of the analog audio signals 71' and 72' is extracted by the first signal processing section 1 and is output as the LFE channel analog audio signal 83. Accordingly, in the case where a speaker for an LFE channel is available, the low frequency component (including a low frequency component of the L channel and a low frequency component of the R channel) can be output from the speaker for the LFE channel. Since a low frequency sound has little directivity, the overall sound quality is not substantially influenced by which speaker outputs the low frequency sound.

In the second example, as described above, an LFE channel digital audio signal obtained as a result of being multiplied with a multiplication coefficient is added to a digital audio signal of each of the L and R channels, which is also obtained as a result of being multiplied with a multiplication coefficient. The resultant signal is D/A-converted, and then an LFE channel analog audio signal is generated by a low pass filter. Due to such a structure, a D/A converter for an LFE channel can be eliminated without spoiling the sound quality. In this cases a low pass filter and a high pass filter are required. Since it is sufficient that the low pass filter and the high pass filter have mild frequency characteristics, the signal processing apparatus can be produced at significantly lower cost as compared to the apparatus including a D/A converter for an LFE channel.

(Recording Medium)

The signal processing performed in the first and second examples is recordable on a recording medium in the form of a program. As the recording medium, any computer-readable recording medium such as, for example, a floppy disc or a CD-ROM can be used. By installing a signal processing program, read from the recording medium, in any computer which can input and output a digital audio signal and an analog audio signal, the computer is allowed to function as a signal processing apparatus. In this case, signal processing can be performed by a signal processing device built in or connected to the computer, or at least a portion of the signal processing can be executed by the computer using software.

Figure 2C:
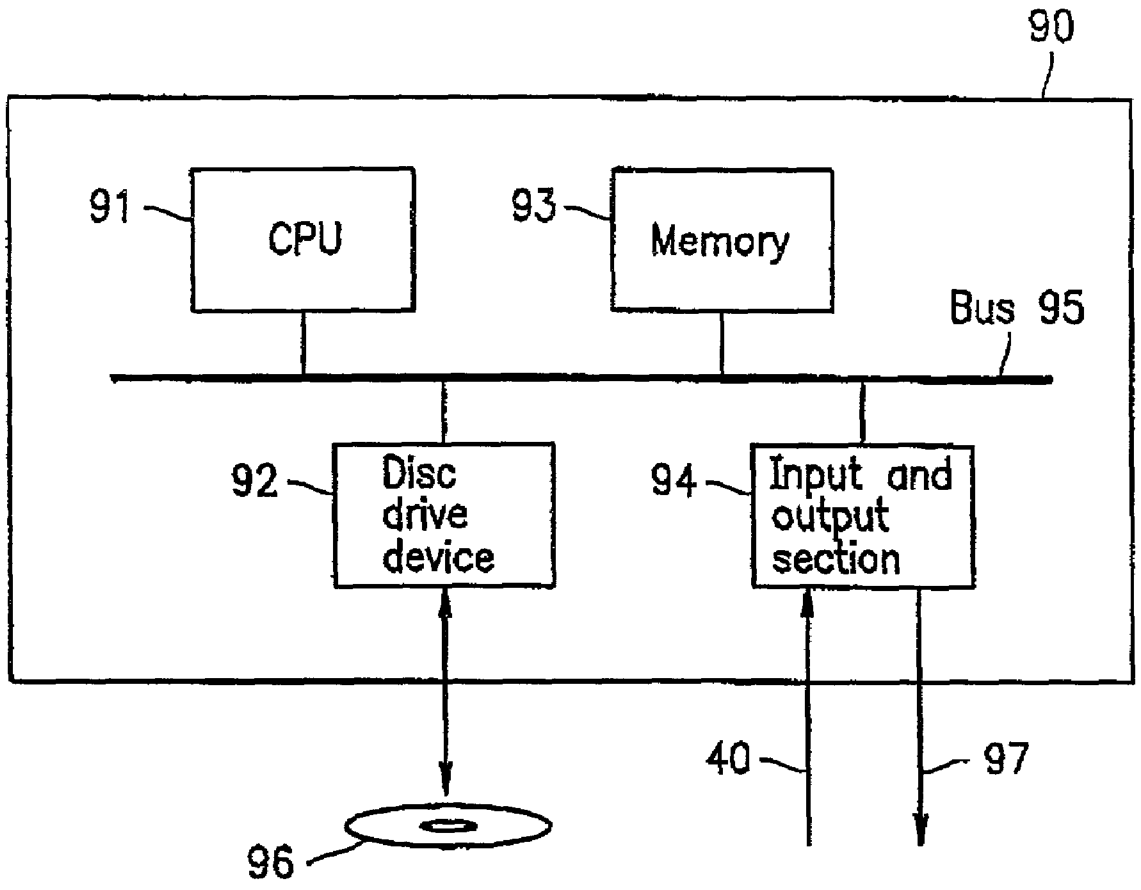
FIG. 2C shows a structure of a computer used for executing a signal processing method according to the present invention.

FIG. 2C shows one exemplary structure of a computer 90 for executing such signal processing. The computer 90 includes a CPU 91, a disc drive device 92 for reading a program from a recording disc 96 storing the program for causing the computer 90 to execute signal processing, a memory 93 for storing the program read by the disc drive device 92, an input and output section 94 for receiving and outputting an audio bit stream signal 40 and analog audio signals 97 of a plurality of channels which are generated by performing signal processing of the audio bit stream signal 40, and a bus 95. In the computer 90, the signal processing described in the first and second examples is performed by the CPU 91 and the memory 93. The memory 93 can be a hard disc or the like.

The program can be provided by a recording medium such as, for example, the recording disc 96 or provided by data distribution via, for example, the Internet.

The audio bit stream signal 40 can be provided by a recording medium such as, for example, a DVD, or provided by data distribution via, for example, digital broadcasting or the Internet.

As described above, according to the present invention, in order to convert a digital audio signal into an analog audio signal so as to reproduce multi-channel signals, an LFE channel digital audio signal is mixed with a digital audio signal of a different channel by digital signal processing. The digital audio signal obtained by the mixing is converted into an analog audio signal. A low frequency component of the analog audio signal is extracted, and thus an LFE channel analog audio signal is generated. An analog audio signal of the different channel can be obtained by removing a low frequency component of the analog audio signal generated as a result of the D/A conversion and then level-adjusting the resultant signal. In this manner, the number of D/A converters can be reduced while keeping the high sound quality of the LFE channel and the general channels. Thus, a high quality signal processing apparatus for multi-channel signals can be provided at low cost. The present invention eliminates a D/A converter for an LFE channel and still outputs a low frequency analog audio signal Independently from the other channels.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A signal processing apparatus, comprising:

a decoder for decoding a stream signal so as to generate a digital audio signal of a low frequency effect channel and digital audio signals of first through n'th (n≧2) channels, wherein the stream signal includes information of a low frequency effect channel, the information containing a low frequency component, and also includes information of the first through n'th channels, the information containing components of all frequency bands, the first through n'th channels having different sound source positions;

an adder section for adding the digital audio signal of the low frequency effect channel and the digital audio signal of a specified channel among the first through n'th channels, so as to generate an addition signal;

an n number of D/A conversion sections for converting the digital audio signals of the first through n'th channels, excluding the digital audio signal of the specified channel, and the addition signal into n types of analog audio signals;

a first signal processing section for performing a first signal processing process of the analog audio signal obtained as a result of D/A conversion of the addition signal, so as to generate an analog audio signal of the low frequency effect channel; and a second signal processing section for performing a second signal processing process of the analog audio signal obtained as a result of D/A conversion of the addition signal, so as to generate an analog audio signal of the specified channel.

2. A signal processing apparatus according to claim 1, further comprising, a multiplication section for adjusting an amplitude of the digital audio signal of the low frequency effect channel generated by the decoder.

3. A signal processing apparatus according to claim 1, further comprising a multiplication section for adjusting an amplitude of the digital audio signal of the specified channel generated by the decoder.

4. A signal processing apparatus according to claim 1, wherein the first signal processing process is a low pass filtering process.

5. A signal processing apparatus according to claim 1, wherein the second signal processing process is one of a high pass filtering process or an all pass filtering process.

6. A signal processing apparatus according to claim 5, wherein the second signal processing section includes a switching section for selecting one of the high pass filtering process and the all pass filtering process, wherein the all pass filtering process is selected when a low frequency analog audio signal is output from the second signal processing section, and the high pass filtering process is selected when the low frequency analog audio signal is not output from the second signal processing section.

7. A signal processing apparatus according to claim 1, wherein n is 5, and the stream signal contains information of 5.1 channels.

8. A signal processing method, comprising the steps of:

decoding a stream signal so as to generate a digital audio signal of a low frequency effect channel and digital audio signals of first through n'th (n≧2) channels, wherein the stream signal includes information of a low frequency effect channel, the information containing a low frequency component, and also includes information of the first through n'th channels, the information containing components of all frequency bands, the first through n'th channels having different sound source positions;

adding the digital audio signal of the low frequency effect channel and the digital audio signal of a specified channel among the first through n'th channels, thereby generating an addition signal;

converting the digital audio signals of the first through n'th channels, excluding the digital audio signal of the specified channel, and the addition signal into n types of analog audio signals;

performing a first signal processing process of the analog audio signal obtained as a result of D/A conversion of the addition signal, thereby generating an analog audio signal of the low frequency effect channel; and performing a second signal processing process of the analog audio signal obtained as a result of D/A conversion of the addition signal, thereby generating an analog audio signal of the specified channel.

* * * * *